No. 778,650. Patented December 27, 1904.

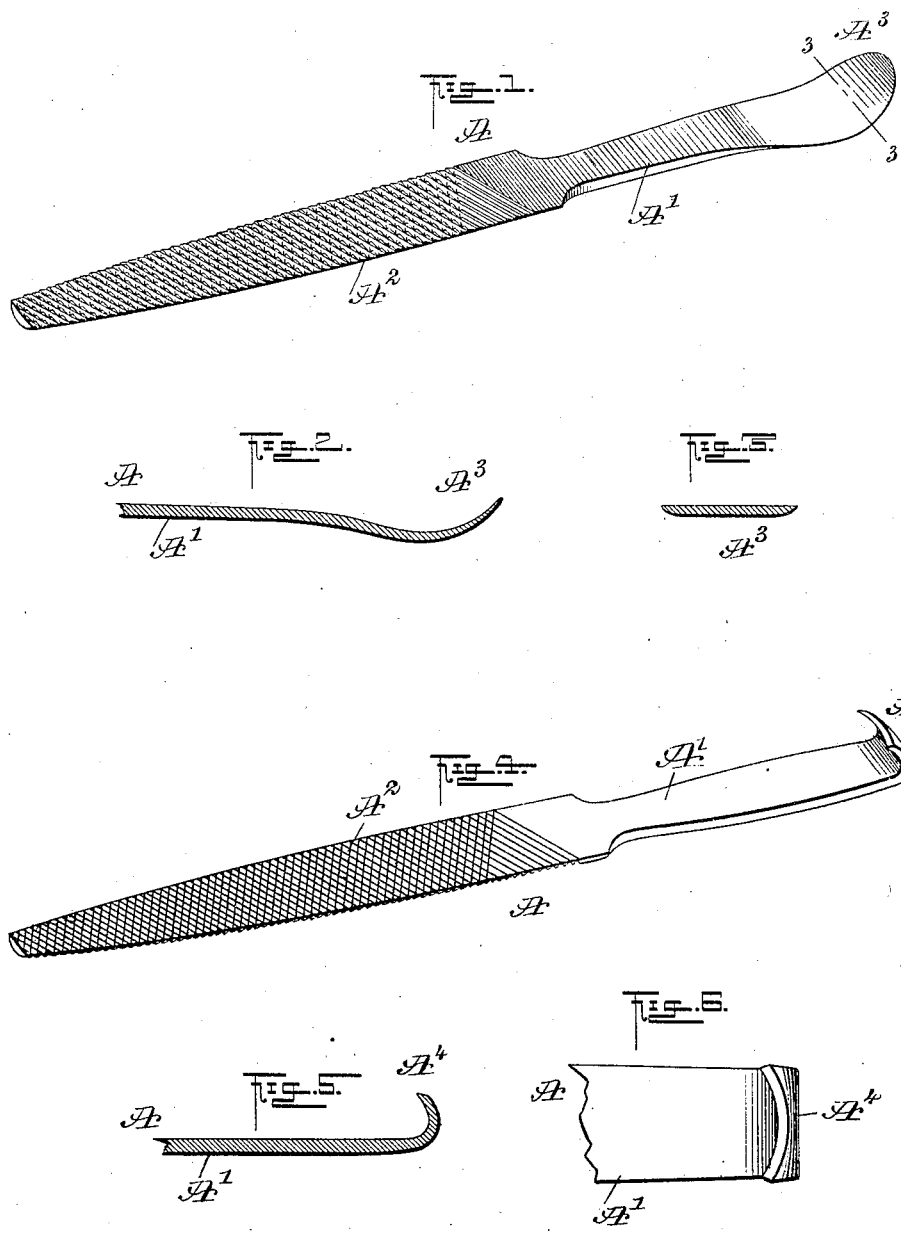

UNITED STATES PATENT OFFICE.

EMIL FORQUIGNON, OF NEW YORK, N. Y.

DENTAL TOOL.

SPECIFICATION forming part of Letters Patent No. 778,650, dated December 27, 1904.

Application filed December 16, 1903. Serial No. 185,387.

*To all whom it may concern:*

Be it known that I, EMIL FORQUIGNON, a citizen of the United States, and a resident of the city of New York, borough of Manhattan, in the county and State of New York, have invented a new and Improved Dental Tool, of which the following is a full, clear, and exact description.

The invention relates to dentistry; and its object is to provide a new and improved dental tool to be used for scaling off calcareous deposits from the teeth and also to enable the dentist to conveniently and quickly form and scrape a tooth-carrying rubber plate to accurately fit the same against the hard palate or roof of a person's mouth.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all the views.

Figure 1 is a perspective view of the improvement arranged for forming the plate. Fig. 2 is a partial longitudinal sectional elevation of the same. Fig. 3 is a transverse section of the same on the line 3 3 of Fig. 1. Fig. 4 is a perspective view of the improvement arranged for scraping the plate. Fig. 5 is a partial longitudinal sectional elevation of the same, and Fig. 6 is an enlarged fragmentary plan view of the same.

The dental tool illustrated in Figs. 1, 2, and 3 is made from a single piece of steel and provided with a shank A, having two integral portions A' and $A^2$, of which the shank portion $A^2$ is in the form of a half-round file, while the shank portion A' terminates at its outer end in a scraping-head $A^3$, dished longitudinally and formed at its periphery with a cutting edge, as plainly indicated in Figs. 1 and 3.

In using the tool the operator can take hold of the shank portion A' and use the shank portion $A^2$ as a file for filing the plate wherever necessary, and when it is desired to form or shape a plate so as to properly fit the same onto the palate or roof of the mouth then the operator takes hold of the shank portion $A^2$ and uses the head $A^3$ for removing or cutting out such portions in the plate as are necessary to fit the plate against the palate or roof of the mouth.

It is sometimes desirable to scrape or gouge out the plate, and then the form of the head is preferably changed, as illustrated, for instance, in Figs. 4, 5, and 6, in which the head $A^4$, extending integrally from the shank portion A', is curved upwardly and rearwardly, and the top edge, which is the cutting edge, is made segmental to allow of readily gouging portions of the plate to properly fit the same against the palate. It is understood that for making deep cuts the head $A^4$ can be more advantageously used than the head $A^3$, as previously described. This form of the device is also especially useful in removing deposits from the teeth.

Having thus described my invention, I claim as new and desire to secure by Letters Patent—

A dental tool comprising a shank made in two integral portions, of which one is formed into a file, and a scraping-head integral on the outer end of the other shank portion and curved upwardly and rearwardly, the top edge being segmental and sharpened, to form a cutting edge, as set forth.

In testimony whereof I have signed my name to this specification in the presence of two subscribing witnesses.

EMIL FORQUIGNON.

Witnesses:
 EMMA C. KOCH,
 ADOLPH KRENN.